Aug. 10, 1954

E. I. ANDERSON 2,686,276

WAVE GENERATING SYSTEM

Filed Aug. 25, 1950

INVENTOR
Earl I. Anderson
BY
[signature]
ATTORNEY

Patented Aug. 10, 1954

2,686,276

UNITED STATES PATENT OFFICE 2,686,276

WAVE GENERATING SYSTEM

Earl I. Anderson, Manhasset, N. Y., assignor to Radio Corporation of America, a corporation of Delaware Application August 25, 1950, Serial No. 181,551

9 Claims. (Cl. 315—27)

Figures 1, 2:
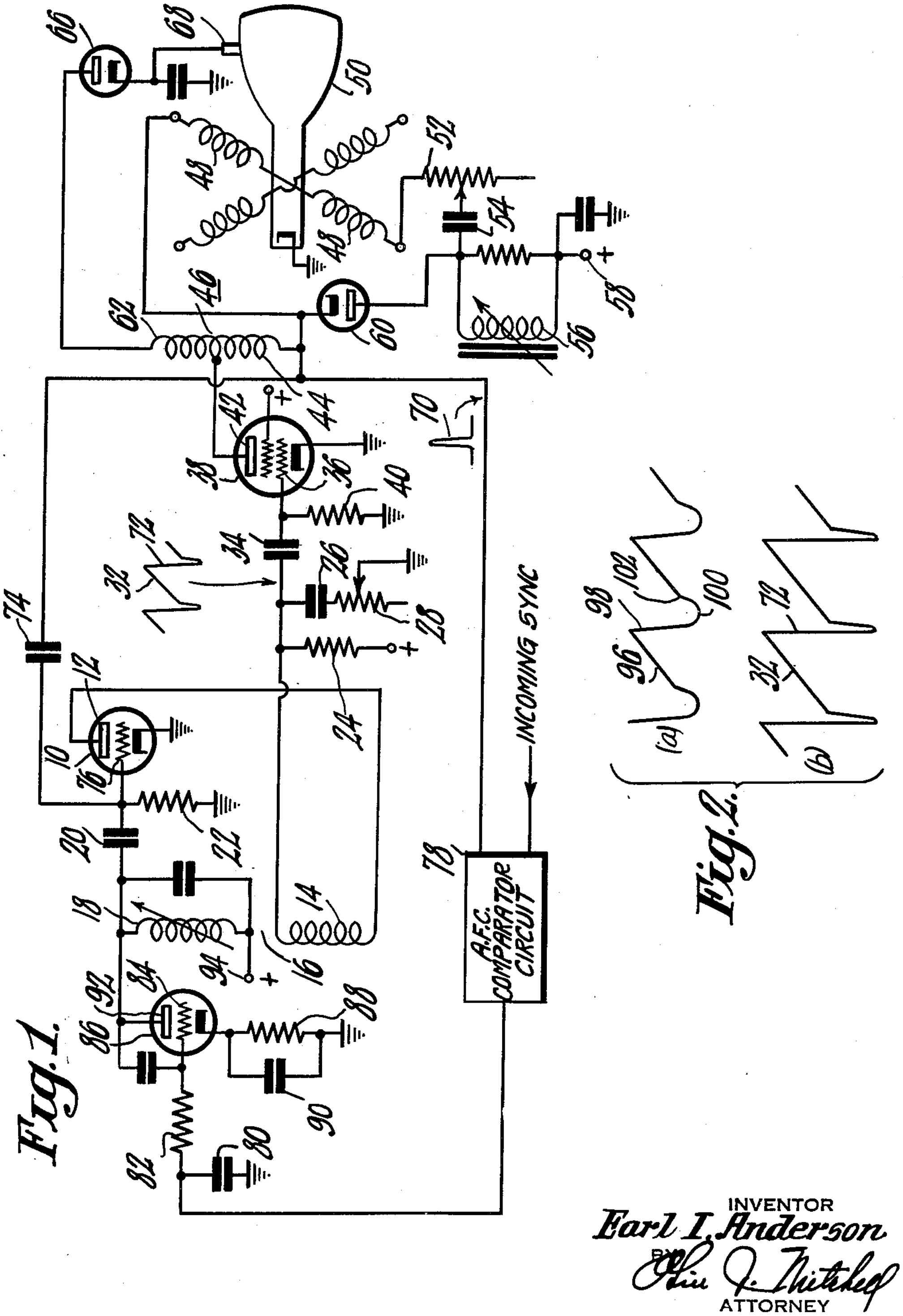

The present invention relates to wave generating systems and more particularly although not necessarily exclusively to wave generators of the television deflection variety.

In one of its aspects the present invention deals more directly with a simple but stable apparatus for producing synchronized saw-tooth deflection signals for use in television receivers.

Many instances arise in the electronic art where it is necessary to provide a stable periodic deflection influence on an accelerated electron beam. Oscillographs, oscilloscopes, television kinescopes, television camera tubes, radar viewing tubes etc., are typical examples of such techniques.

In the television art, however, and particularly that branch having to do with the design and manufacture of television receivers for home use, such cathode ray beam deflection circuits as may be necessary must be simple and inexpensive without sacrificing to too great an extent the desirable qualities of stability and wave form accuracy. The problems attending the design of suitable deflection circuits for television use are fully treated in an article entitled "Television Deflection Circuits" by A. W. Friend appearing in the RCA Review for March 1947. Another article entitled "Magnetic Deflection Circuits for Cathode Ray Tubes" by Otto H. Schade appearing in the RCA Review for September 1947, further treats the subject of television deflection circuits.

Experience has shown that one of the most desirable types of deflection circuit arrangement for television receivers is that which takes advantage of the inherent stability of the sine wave oscillator. Multivibrator and blocking oscillator types of deflection circuits such as for example shown in U. S. Patent 2,436,663 by D. E. Nogaard entitled "Saw Tooth Wave Generator" and U. S. Patent 2,284,378 by R. B. Dome entitled "Deflection Circuit" although perhaps simpler in circuitry than some sine wave oscillator systems are generally regarded as being less desirable for reasons of stability and noise immunity. Nonetheless, deflection circuits of the general type represented by these patents find favor in television receiver manufacture because of the above mentioned consideration of reduced cost and simplicity.

Most prior art schemes for using a sine wave oscillator as a basis for saw-tooth deflection voltage or current generation assume rather complex and expensive forms because of the transitional process usually employed of changing the developed sine wave oscillation into a saw-tooth wave form. A particularly successful deflection circuit of this type is shown in U. S. Patent 2,460,112 entitled "Deflection Circuit" by Antony Wright et al., issued January 25, 1949. In this particular circuit a sine wave type oscillator is adjusted to produce a distorted wave form the peak of which is adapted to actuate a conventional saw-tooth discharge tube. The wave form developed across the saw-tooth capacitor with which the saw-tooth discharge tube is in shunt, is then applied to a deflection output amplifier which drives the deflecting means for the television receiver. It is thus seen that three circuit steps are employed: First, the generation of a control voltage by a sine wave type oscillator; second, the distorting of this wave forms to properly actuate a deflection wave form generator; and third, the application of the deflection wave form to a power amplifier.

It is, therefore, a purpose of the present invention to provide a deflection circuit based upon sine wave oscillator action which is substantially simpler than any known prior art deflection arrangements of this type.

It is another purpose of the present invention to so modify the circuitry and operation of the conventional sine wave oscillator so that a saw-tooth deflection wave form may be simply and inexpensively obtained.

In the realization of the above objects, the present invention contemplates the use of an electron discharge tube as a class C type oscillator in which current flows for only a portion of the sine wave cycle. A saw-tooth discharge capacitor and associated charging circuit for the capacitor is then connected in shunt with the oscillator tube so that the saw-tooth capacitor will be discharged during the conduction interval of the oscillator tube. The conduction interval of the sine wave oscillator is then in accordance with the present invention shortened by the application of a regenerative control pulse to the oscillator so that the "fly back" interval of the developed saw-tooth wave form will be sufficiently shortened.

It therefore becomes another object of the present invention to provide a sine wave oscillator circuit of the class C variety in which the periodic conduction intervals of the tube may be substantially shortened.

A more complete understanding of the present invention as well as additional objects and features of advantage will be gained through a reading of the following description especially when taken in connection with the accompanying drawings in which:

Figure 1 is a combination schematic and block and diagrammatic representation of one embodiment of the present invention as applied to a magnetic deflection circuit for a cathode ray tube.

In Figure 2 is a graphical presentation of certain wave forms encountered in the practice of the present invention.

Turning now to Figure 1, there is shown at the upper central portion of the figure a discharge tube 10 connected as a sine wave oscillator. The anode 12 of the oscillator tube is connected with feed back winding 14 of the oscillator transformer 16. The output of the tube 10 is thereby regeneratively fed back into the resonant input circuit 18 of the oscillator tube 10. The resonant circuit 18 is capacitively coupled by a capacitance 20 to the control electrode of the tube 10. Resistance 22 provides a suitable ground return for the oscillator control electrode. A positive potential is applied to the anode 12 of the oscillator tube through resistor 24 which is of a value suitable for use as a charging resistance for a saw-tooth capacitor such as 26. Variable resistances 28 in series with capacitor 26 acts as a conventional peaking resistance. Saw-tooth wave form 32 appearing across the saw-tooth capacitor and peaking resistance combination is coupled via capacitor 34 to the grid 36 of the deflection output amplifier discharge tube 38. A ground return resistance 40 is, of course, provided for the control electrode 36.

The precise form of the deflection output stage used in conjunction with the present invention is not of particular concern. The reaction scanning output stage connected with the discharge tube 38 is therefore only exemplary of one form of the deflection output stage whch may be successfully excited by the saw-tooth deflection voltage developed by the present invention. The circuitry connected to the output of the discharge tube 38 is fully described in the service manual for the RCA Television Receivers 2T50 and 2T60 published May 19, 1950, and released by the RCA Victor Division of the Radio Corporation of America. Briefly the anode 42 of the output tube 38 is connected through the primary 44 of an auto transformer 46 to the horizontal deflection yoke winding 48 associated with the kinescope 50. The lower terminal of the deflection yoke winding 48 is connected through width control resistance 52 and "B" boost capacitor 54 to the upper terminal of the linearity control inductance 56. The lower terminal of the linearity control inductance 56 is then in turn connected with a positive power supply terminal 58. A damper tube 60 is connected in shunt with the deflection yoke winding 48 through the "B" boost capacitor 54. High voltage transition across the high impedance secondary 62 of the auto transformer 66 are rectified by the high voltage rectifier 66 to produce a suitable accelerating potential for the second anode 68 of the kinescope 50.

Regardless of the form of electromagnetic deflection circuit used, there will appear across the impedance in the load circuit of tube 38 a high amplitude transient concurrent with the steep edge of "fly back" portion of the saw-tooth deflection wave form. This pulse is indicated at 70 and occurs during the downward going portion 72 of the saw-tooth wave form at 32.

According to the present invention this positive-going pulse 70 is fed back via capacitor 74 to the control electrode 76 of the oscillator tube 10. Furthermore, the fly back pulse 70 is applied to an automatic frequency control comparator circuit shown in block form at 78 which compares the timing of the incoming horizontal synchronizing signal with the timing of the fly back pulse 70. The output of the A. F. C. circuit 78 is a D. C. control potential which is filtered by means of capacitor 80 and is applied through resistance 82 to the grid 84 of a frequency control tube such as 86. Tube 86 is provided with a conventional cathode resistance 88 and is suitably by-passed by capacitor 90. The anode 92 of the frequency control tube is connected with the upper end of the oscillator input tank circuit 18 and is supplied with positive bias potential through the connection of the lower extremity of a power supply terminal 94. The anode-control electrode capacity of the frequency control circuit tube 86 along with the rather low value of resistance 82 allows typical reactance tube operation of the frequency control tube 86. The coupling capacitor 20 previously described blocks the positive D. C. potential appearing on the input tank circuit from the control electrode 76 of oscillator tube 10.

The operation of the present invention is substantially as follows. The coupling between windings 14 and 18 of the oscillator transformer 16 is adjusted so that the tube 10 operates as a conventional sine wave oscillator of the class C variety. That is, conduction in the tube 10 occurs only duirng a portion of the sine wave period. The relative duration of the conduction period may, as in most sine wave oscillator circuits of this type, be altered by changing the time constant of coupling capacitor 20 taken with ground return resistor 22. The value of this time constant and the resistance value of resistor 22 will determine the bias on the control electrode of the tube 10 and hence the point at which the tube 10 conducts. In accordance with the present invention, however, the positive potential for the anode of oscillator tube 10, as previously described, is supplied through a resistor 24 which also acts as a charging resistor for a saw-tooth capacitor 26. Thus, during non-conduction of the discharge tube 10 the saw-tooth capacitor will charge virtually linearly until the oscillator tube 10 conducts. Upon conduction saw-tooth capacitor 26 will discharge through the tube to form the "fly-back" portion of the saw-tooth wave form. Under normal conditions the resulting wave form appearing across the capacitor 26 would appear as shown in Figure 2*a*. The substantially straight line portion 96 of the saw-tooth wave will represent linear charging of the capacitor 26 during non-conduction of the discharge tube 10 while the steep near-vertical portion 98 of the wave represents the drop in voltage at the upper terminal of capacitor 26 with respect to ground, upon conduction of the discharge tube 10.

Without special measures of the type provided by the present invention and presently to be described, the wave form in Figure 2*a* would not be entirely suitable for deflection purposes since the lower extremity of the "fly-back" portion 98 of the saw-tooth wave form will be followed by a portion 100 of a sine wave signal variation. This is due to too long a period of conduction of the discharge tube 10. From the wave form 2*a*, it can be seen that the tube 10 becomes non-conducting at 102 at which time the charging of the capacitor 26 commences. This irregularity in deflection waveform is overcome by the present invention through the application of the rather short trace fly-back pulse 70 to the control electrode of the oscillator tube 10 described hereinabove. The application of the positive-going fly-back pulse 70 as indicated, produces a very short period of heavy conduction through the tube 10. This causes a very quick discharge of the saw-tooth capacitor 26 and with the aid of peaking resistor 28, provides the ideal wave form shown in Figure 2b. The reduced period of conduction in tube 10 prevents the appearance of the sine wave portion 100 discussed above.

The A. F. C. comparator circuit 78 and its action on the frequency control reactance tube 86 to change the resonant frequency of the oscillator input circuit 18 forms no part of the present invention. A suitable A. F. C. comparator circuit and frequency control arrangement is fully described in the above referenced U. S. Patent 2,460,112 by Antony Wright et al.

From the above it will be seen that the applicant has provided a new and useful deflection wave form generating circuit having a high frequency-stability which is comparable to a sine wave oscillator but yet directly derives from the sine wave oscillator a saw-tooth deflection wave form of the type usually produced in the prior art by tubes and circuity separate from and in addition to the sine wave oscillator. It is also apparent from the foregoing teaching that although specific tube types have been shown, other types of electron discharge tubes may be advantageously employed. Furthermore, it is anticipated that although the regenerative fly back pulse derived from the deflection output circuit forms a convenient way of shortening the conduction period of the sine wave oscillator 10, other means may be provided for deriving synchronous pulses suitable for decreasing the conduction period of the oscillator 10. It is further within the scope of the present invention that such a feed back pulse be applied to other electrodes of the oscillator tube than merely the control electrode. Proper choice of feed back pulse polarity will have to be made of course in order to insure that the feed back pulse acts to reduce the conduction period of the oscillator tube.

Having thus described my invention what is claimed is:

1. In an electrical circuit the combination of, a class C type sine wave oscillator comprising an electron discharge device having an input and output connection with a feedback coupling therebetween, said feedback coupling being so adjusted that said discharge device is rendered conductive only during a portion of the sine wave cycle, means coupled with said oscilllator for developing a pulsed wave form in synchronism with said oscillator said pulsed wave form having a peak of shorter duration than the conduction period of said discharge device, and means for regeneratively applying said pulsed wave form as additional feedback to said discharge device such as to periodically shorten the conduction time of said discharge device.

2. Apparatus according to claim 1 wherein said electron discharge device is connected for periodic discharge of a saw-tooth generating capacitor during conduction periods of said discharge device.

3. In an electromagnetic deflection system, a first electron discharge tube having at least an anode, a cathode and a control electrode, an input circuit connected between said control electrode and cathode, an output circuit connected between said anode and said cathode, oscillatory means for regeneratively coupling said input and output circuits to produce substantially sinusoidal oscillation in the input circuit of said discharge tube said discharge tube having a period of conduction of only a portion of one-half cycle of the sinusoid, a saw-tooth capacitor and associated charging circuit connected with said output circuit for periodic discharge of the capacitor to produce a saw-tooth deflection waveform wave, wave shaping means connected with said capacitor for converting a portion of said saw-tooth waveform into a control pulse waveform which is of shorter duration than said discharge tube conduction period, and means for applying said shorter duration control pulse waveform directly to said control electrode in regenerative relation thereto.

4. Apparatus according to claim 3 wherein said wave shaping means comprises a reaction scanning deflection amplifier designated for excitation of an electromagnetic deflection yoke and wherein said control pulse represents the fly-back transient of said saw-tooth waveform acting on the inductive load presented by said deflection yoke.

5. An electrical circuit, according to claim 1, wherein there is additionally provided a source of synchronizing pulses and an automatic frequency control circuit coupled with said synchronizing signal source and said oscillator for controlling the frequency of said oscillator in accordance with said synchronizing signal.

6. In a cathode ray beam deflection system, the combination of a sine wave oscillator including an electron tube, said electron tube having at least an anode, a cathode, and a control electrode, a source of synchronizing signals, an input circuit connected to said control electrode, said input circuit including a parallel resonant circuit, said parallel resonant circuit having a resonant frequency substantially equal to the frequency of oscillation of said sine wave oscillator, an output circuit connected to said anode, said output circuit being regeneratively coupled to said input circuit, the output circuit of said sine wave oscillator including means for providing a sawtooth shaped waveform, an amplifier having an input and an output circuit, a connection from said amplifier input circuit to said sawtooth providing means, an inductive load, a connection from said amplifier output circuit to said inductive load, a feedback loop from said inductive load to the input circuit of said sine wave oscillator electron tube and an automatic frequency control system responsively coupled to said synchronizing signal source and said oscillator so as to stabilize the operating frequency of said oscillator in accordance with said synchronizing signals.

7. In a cathode ray beam deflection system, the combination of a sine wave oscillator including an electron tube, said electron tube having at least an anode, a cathode and a control electrode, an input circuit connected to said control electrode, said input circuit including a parallel resonant circuit, said parallel resonant circuit adapted to control the frequency of oscillation of said sine wave oscillator, an isolating impedance included in said input circuit between said control electrode and said resonant circuit, an output circuit connected to said anode, means for regeneratively coupling said output circuit to said input circuit, means connected to said output circuit for providing a sawtooth shaped waveform, an amplifier having an input and an output, said amplifier input connected to said sawtooth providing means, an inductive load, said amplifier output coupled to said inductive load, and a feedback loop from said inductive load to the control electrode side of said isolating impedance.

8. In a cathode ray beam deflection system, a sine wave oscillator including an electron tube, said electron tube having at least a cathode, an anode, and a control electrode, a parallel resonant circuit, said parallel resonant circuit having a resonant frequency substantially equal to the frequency of oscillation of said sine wave oscillator, a capacitor, said parallel resonant circuit connected through said capacitor to said control electrode, said anode electro-magnetically coupled to said parallel resonant circuit, sawtooth shaping means connected to said anode, an amplifier having an input and an output, said amplifier input connected to said sawtooth shaping means, and said amplifier output being regeneratively coupled to the control electrode side of said capacitor.

9. In a cathode ray beam deflection system, a source of synchronizing signal, a sine wave oscillator including an electron tube, said electron tube having at least a cathode, an anode, and a control electrode, a parallel resonant circuit, said parallel resonant circuit adapted to control the frequency of oscillation of said sine wave oscillator, a capacitance, said parallel resonant circuit coupled to said control electrode by means of said capacitance, means for electro-magnetically coupling said anode to said parallel resonant circuit, sawtooth shaping means connected to said anode, an amplifier having an input and an output, said amplifier input connected to said sawtooth shaping means, said amplifier output regeneratively coupled to the control electrode of said sine wave oscillator electron tube, and a reactance tube frequency control circuit connected in shunt with said parallel resonant circuit, frequency comparing means coupled with said reactance tube circuit and responsive to said synchronizing signal source and said oscillator for stabilizing the operation of said oscillator.

References Cited in the file of this patent

UNITED STATES PATENTS

| Number | Name | Date |
|---|---|---|
| 2,093,177 | Vance | Sept. 4, 1937 |
| 2,277,000 | Bingley | Mar. 17, 1942 |
| 2,418,425 | Poch | Apr. 1, 1947 |
| 2,479,081 | Poch | Aug. 16, 1949 |
| 2,585,930 | Gruen | Feb. 19, 1952 |